United States Patent
Gölden et al.

(10) Patent No.: US 10,862,182 B2
(45) Date of Patent: Dec. 8, 2020

(54) RF PHASE SHIFTER COMPRISING A DIFFERENTIAL TRANSMISSION LINE HAVING OVERLAPPING SECTIONS WITH TUNABLE DIELECTRIC MATERIAL FOR PHASE SHIFTING SIGNALS

(71) Applicant: ALCAN Systems GmbH, Darmstadt (DE)

(72) Inventors: Felix Gölden, Roßdorf (DE); Alexander Gäbler, Darmstadt (DE); Onur Hamza Karabey, Darmstadt (DE)

(73) Assignee: ALCAN Systems GmbH, Darmstadt (DE)

( * ) Notice: Subject to any disclaimer, the term of this patent is extended or adjusted under 35 U.S.C. 154(b) by 3 days.

(21) Appl. No.: 16/055,225

(22) Filed: Aug. 6, 2018

(65) Prior Publication Data

US 2020/0044300 A1 Feb. 6, 2020

(51) Int. Cl.
*H01P 1/18* (2006.01)
*H01Q 21/00* (2006.01)
(Continued)

(52) U.S. Cl.
CPC .............. *H01P 1/181* (2013.01); *H01P 1/184* (2013.01); *H01Q 3/38* (2013.01);
(Continued)

(58) Field of Classification Search
CPC .... H01P 1/182; H01P 1/18; H01P 9/00; H01P 1/181; H01P 1/184
(Continued)

(56) References Cited

U.S. PATENT DOCUMENTS 5,355,104 A 10/1994 Wolfson et al.
5,537,242 A 7/1996 Lim
(Continued)

FOREIGN PATENT DOCUMENTS

CN 1373916 A 10/2002
CN 1728448 A 2/2006
(Continued)

OTHER PUBLICATIONS

Dielectric resonator antenna phased array with liquid crystal based phase shifters, Authors: Mehmood Arshad, Karabey Onur Hamza, Ayluctarhan Muhammed, Zheng Yuliang, Braun Hubertus, Hovhannisyan Martun, Letz Martin, Jakoby Rolf, Publication data: The 8th European Conference on Antennas and Propagation (EuCAP 2014),,Apr. 6, 2014,European Association on Antennas and Propagation, Source info: pp. 2436-2439.
(Continued)

*Primary Examiner* — Benny T Lee
(74) *Attorney, Agent, or Firm* — Smartpat PLC (57) ABSTRACT

A phase shifting device with a linear transmission line comprises a first electrode and a second electrode that are spaced at a distance from each other. A tunable dielectric material is arranged between the first electrode and the second electrode. The transmission line comprises several overlapping section. An overlapping area of the first electrode overlaps an overlapping area of the second electrode in order to provide a parallel plate capacitor area that affects the phase of an electromagnetic signal that propagates along the transmission line. The first electrode and the second electrode are electrically connected to a bias voltage source with bias electrodes which consist of a material with a lower electrical conductivity that that of the first and second electrode.

19 Claims, 5 Drawing Sheets

(51) Int. Cl.
*H01Q 3/38* (2006.01)
*H01G 7/06* (2006.01)
*H01Q 21/06* (2006.01)

(52) U.S. Cl.
CPC .......... *H01Q 21/0075* (2013.01); *H01G 7/06* (2013.01); *H01Q 21/065* (2013.01)

(58) Field of Classification Search
USPC ........................................................ 333/161
See application file for complete search history.

(56) References Cited

U.S. PATENT DOCUMENTS

| | | | |
|---|---|---|---|
| 5,936,484 | A | 8/1999 | Dolfi et al. |
| 6,611,230 | B2 * | 8/2003 | Phelan .................... H01P 1/181 333/161 |
| 6,759,980 | B2 | 7/2004 | Chen et al. |
| 6,864,840 | B2 | 3/2005 | Zhu et al. |
| 7,145,412 | B2 * | 12/2006 | Hunt et al. ......... G02B 6/12004 333/24 R |
| 7,361,288 | B2 | 4/2008 | Lüssem et al. |
| 7,466,269 | B2 | 12/2008 | Haziza |
| 7,884,766 | B2 | 2/2011 | Haziza |
| 2002/0126048 | A1 | 9/2002 | Zhu et al. |
| 2005/0110595 | A1 * | 5/2005 | du Toit .................... H01P 1/181 333/157 |
| 2005/0128029 | A1 * | 6/2005 | Lee et al. ................ H01P 1/181 333/161 |
| 2008/0116995 | A1 * | 5/2008 | Kim et al. .............. H01P 1/181 333/161 |
| 2009/0091500 | A1 | 4/2009 | Haziza |
| 2009/0278744 | A1 | 11/2009 | Kirino et al. |
| 2012/0119141 | A1 | 5/2012 | Manabe et al. |
| 2012/0182200 | A1 | 7/2012 | Manabe et al. |
| 2018/0287254 | A1 | 10/2018 | Nakano et al. |
| 2019/0103644 | A1 | 4/2019 | Jakoby et al. |
| 2019/0260139 | A1 | 8/2019 | Jakoby et al. |

FOREIGN PATENT DOCUMENTS

| | | |
|---|---|---|
| CN | 101283480 A | 10/2008 |
| CN | 101454941 B | 11/2013 |
| EP | 0887879 A1 | 12/1998 |
| EP | 2768072 A1 | 8/2014 |
| EP | 2020051 B1 | 9/2016 |
| EP | 2956986 B1 | 2/2017 |
| EP | 2761693 B1 | 5/2017 |
| JP | S5893002 A | 6/1983 |
| JP | S6068701 A | 4/1985 |
| JP | H077303 B2 | 1/1995 |
| JP | H10145103 A | 5/1998 |
| JP | 2000315902 A | 11/2000 |
| JP | 2002330006 A | 11/2002 |
| JP | 2003008310 A | 1/2003 |
| JP | 2005064632 A | 3/2005 |
| JP | 2007110256 A | 4/2007 |
| JP | 2009538565 A | 11/2009 |
| WO | 9626554 A1 | 8/1996 |
| WO | 2011009524 A1 | 1/2011 |
| WO | 2011035863 A1 | 3/2011 |
| WO | 2011036243 A1 | 3/2011 |

OTHER PUBLICATIONS

Fully printed tunable phase shifter for L/S-band phased array application, Authors: Nikfalazar Mohammad, Kohler Christian, Friederich Andreas, Sazegar Mohsen, Zheng Yuliang, Wiens Alex, Binder Joachim R, Jakoby Rolf, Publication data: 2014 IEEE MTT-S International Microwave Symposium (IMS2014),,Jun. 1, 2014,IEEE, Source info: pp. 1-4.

Liquid crystal varactor loaded variable phase shifter for integrated, compact, and fast beamsteering antenna systems, Authors: Hu Wenjuan, Karabey Onur Hamza, Gabler Alexander, Prasetiadi Ananto Eka, Jost Matthias, Jakoby Rolf, Publication data: 2014 9th European Microwave Integrated Circuit Conference,,Oct. 6, 2014,European Microwave Association—EUMA, Source info: pp. 660-663.

Reconfigurable and Tunable Metamaterials: A Review of the Theory and Applications, Authors: Jeremiah P Turpin, Jeremy A Bossard, Kenneth L Morgan, Douglas H Werner, Pingjuan L Werner, Publication data: International Journal of Antennas and Propagation,,Jan. 1, 2014, Source info: vol. 11, Nr: 4, pp. 836-818.

Tunable loaded line phase shifters for microwave applications, Authors: Onur Hamza Karabey, Felix Goelden, Alexander Gaebler, Sebastian Strunck, Rolf Jakoby, Publication data: Microwave Symposium Digest (MTT), 2011 IEEE MTT-S International,,Jun. 5, 2011,IEEE, Source info: pp. 1-4.

* cited by examiner

RF PHASE SHIFTER COMPRISING A DIFFERENTIAL TRANSMISSION LINE HAVING OVERLAPPING SECTIONS WITH TUNABLE DIELECTRIC MATERIAL FOR PHASE SHIFTING SIGNALS

TECHNICAL FIELD

The invention relates to a radio frequency phase shifting device with a transmission line comprising a first electrode and a second electrode that are spaced at a distance from each other, and which are used for propagation of a radio frequency electromagnetic signal along the first electrode and the second electrode with a phase difference of 180° between the respective electromagnetic signals, wherein a tunable dielectric material affects a phase shift of the electromagnetic signal that is propagated along the transmission line.

BACKGROUND

Phase shifting devices can be used to modify the relative displacement between two corresponding features like peaks or zero crossings of an electromagnetic wave or signal without changing the frequency of the electromagnetic wave or signal. When two or more electromagnetic signals of the same frequency are superimposed, the result depends on the phase difference between the respective electromagnetic signals. The electromagnetic signals can be reinforced or weakened. Furthermore, by superimposing two or more electromagnetic waves that are radiated by respective antennas, the phase difference between the radiated electromagnetic waves will determine a direction of a reinforced superposition of the electromagnetic waves, resulting in a preferred direction of irradiation originating from the respective antennas.

In order to intensify the reception or emission of electromagnetic irradiation from a given direction, a phased array antenna comprises several antenna elements that are distributed next to each other. The phase difference of electromagnetic signals received or emitted by the respective antennas is predetermined in such a manner that the superposition of the respective signals is maximized for a given direction, resulting in enhanced signal sensitivity or signal emission for said direction.

There are known prior art phase shifting devices that create a pre-set phase difference between the incoming and outgoing signal. A phased array antenna that is equipped with such constant phase shifting devices can be designed to maximize the signal sensitivity or signal emission for a given single direction.

Furthermore, phase shifting devices with a tunable phase difference are known and described for example in EP 2 761 693 A1 or EP 2 956 986 B1. These phase shifting devices include a linear transmission line comprising a first electrode and a second electrode that are spaced at a distance to each other, wherein a tunable dielectric material is arranged between the first electrode and the second electrode. The phase difference created by a tunable phase shifting device can be tuned, i.e. it can be operated to produce different phase differences whereby the respective phase difference can be modified and controlled by a control setting applied to the tunable dielectric material which affects the phase of the signal along the linear transmission line. A phased array antenna with several antennas that are interconnected with such tunable phase shifting devices can be operated in such a manner as to change the direction of enhanced signal sensitivity or signal emission in accordance to the requirements at a given time.

Therefore, one of the key components which are necessary to build phased array antennas with adaptive beam forming is a tunable phase shifting device, meaning a device which dynamically can adjust the phase or the delay of a radiofrequency signal. Usually, there is at least one phase shifting device for each radiating element of the array antenna. Each phase shifter device in turn is fed by a feed network. Due to the usually required large number of radiating elements, an at least equally large number of phase shifting devices must be integrated within a limited area in such a phase array antenna.

Accordingly, there is a need for a phase shifting device that allows for easy manufacturing, requires little space and provides for a large phase difference between the input signal and the output signal. Easy manufacturing is possible if techniques can be used to fabricate a large number of electrodes at high density on an area of for example 0.5 m² which is a typical surface area for phased array antennas operating at frequencies of for example 20 GHz. The necessary fabrication techniques are in principle known from Liquid Crystal Display (LCD) manufacturing but are usually not applied to building phased array antennas. In order to employ the fabrication techniques of LCD manufacturing suitable tunable phase shifter topologies have to be found which can be both electrically and also mechanically be integrated in a phased array antenna system.

Accordingly, there is a need for a phase shifting device that allows for easy manufacturing, requires little space and provides for a large phase difference between the input signal and the output signal.

SUMMARY OF THE INVENTION

The present invention relates to a radio frequency phase shifting device with a transmission line with a first electrode and a second electrode, wherein the transmission line comprises several non-overlapping sections, wherein the first electrode extends at a distance from the second electrode, and wherein the transmission line comprises several overlapping sections, wherein an overlapping area of the first electrode is overlapped by a capacitor electrode area and wherein an overlapping area of the second electrode is overlapped by a capacitor electrode area in order to provide for a parallel plate capacitor area within the overlapping section, and wherein a tunable dielectric material is arranged between the respective capacitor electrode areas and the overlapping area of the first electrode and the overlapping area of the second electrode that affects the phase of a radio frequency electromagnetic signal that propagates along the overlapping section of the transmission line. The phase of the electromagnetic signal that propagates along the transmission line will be affected by the parallel plate capacitor areas that are distributed along the transmission line. The electromagnetic signal is preferably a radiofrequency signal with a frequency in the range of 20 kHz to 300 GHz. The phase shifting device is adapted to transmit such a radiofrequency signal and to affect and modify the phase of this signal.

From a topological view the transmission line with non-overlapping sections and with overlapping sections is similar to a periodically loaded differential or balanced transmission line. The resulting phase shift depends inter alia on the number and the area of the parallel plate conductor areas that are implemented along the transmission line.

Preferably the tunable dielectric material is a liquid crystal material with a high dependency of the dielectric characteristics on an electric field that is applied to the liquid crystal material. Suitable liquid crystal materials as well as other tunable dielectric materials are known in the art and commercially available. The electric field that is applied to the liquid crystal material superimposes the radio frequency signal that is propagated along the transmission line, but this does not significantly interfere with the signal propagation.

According to an advantageous aspect of the invention the overlapping area of the first electrode overlaps the overlapping area of the second electrode in order to provide for one parallel plate capacitor area. Thus, no dedicated and separate capacitor electrodes are required. The first electrode and the second electrode are divided into sections that do not overlap each other and into sections that do overlap each other. The tunable dielectric material is arranged between the first electrode and the second electrode. The tunable dielectric material may be arranged as a layer that is confined by glass or other material. The surface of the layer may extend over both electrodes and cover overlapping sections and non-overlapping sections of the first electrode and the second electrode. It is also possible to limit the tunable electric material to separate areas that only cover the respective capacitor electrode areas between the first electrode and the second electrode.

According to an alternative aspect of the invention the first electrode and the second electrode are arranged side by side, and a capacitor electrode is arranged above or below the first electrode and the second electrode in such a manner that a first capacitor electrode area overlaps the overlapping area of the first electrode and that a second capacitor electrode area overlaps the overlapping area of the second electrode, thus providing for two parallel plate capacitor areas between the capacitor electrode and the respective overlapping areas within the overlapping section. The first electrode and the second electrode may be arranged next to another on the same level of the phase shifting device. In addition to the first and the second electrode at least one or a few, but preferably many capacitor electrodes are arranged at another level below or above or below and above the first and second electrodes. The use of separate capacitor electrodes allows for complex shapes of the parallel plate capacitor areas along the transmission line and may simplify the manufacturing of the phase shift device.

According to an advantageous embodiment of the invention, the first electrode is arranged at a first surface of a first substrate layer, in that the second electrode is arranged at a second surface of a second substrate layer, wherein the first surface of the first substrate layer faces the second surface of the second substrate layer and wherein the first surface is arranged at a distance to the second surface. The first electrode and the second electrode can be manufactured by deposition of electroconductive material onto a corresponding non-conducting substrate layer. The two substrate layers can be spaced at a distance from each other, thereby confining an intermediary layer of the tunable dielectric material. Such a sandwich structure can be manufactured by easily controllable and reliable methods. The space requirement is approximately one millimeter for the thickness of the sandwich structure. Manufacture of the sandwich structure is similar to fabrication of liquid crystal displays and can be integrated into the respective production methods which then include such phase shifting devices. The substrate layers can be made of glass or any other material with non-conductive or sufficiently low conductive characteristics and with sufficient surface smoothness.

According to an advantageous embodiment of the invention the first surface of the first substrate layer and the second surface of the second substrate layer confine the tunable dielectric material. Thus, no further substrate layers are required for confining the tunable dielectric material, which reduces the size and manufacturing costs for the phase shifting device.

In another aspect of the invention the first electrode and the second electrode each comprise a strip-shaped transmission line segment, wherein both transmission line segments are directed along the transmission line. A strip-shaped transmission line segment usually has a uniform width. Both transmission line segments can be of linear shape, i.e. the strip-shaped transmission line segment extends along a straight line, wherein the respective transmission segments are parallel and at a distance to each other.

The strip-shape transmission line segment can also be curved. It is also possible for the strip-shape transmission segment to comprise linear sections in combination with corners or curved sections. Furthermore, the strip-shaped transmission segment may also have a spiral shape or meandering shape. The strip-shape transmission line segment may also have a zig-zag pattern.

According to another aspect of the invention, each of the overlapping areas of the first electrode and/or of the second electrode is laterally protruding from the respective strip-shaped transmission line segment of the first electrode and/or of the second electrode. When viewed from above, the combined shape of the first electrode and the second electrode can be similar to a ladder, wherein the strip-shaped transmission line segment of the first electrode and of the second electrode are similar to the first and second ladder beams, and wherein the laterally protruding overlapping areas are similar to the rungs of the ladder. Each rung of the ladder comprises one overlapping area that protrudes from the strip-shaped transmission line segment of the first electrode, and one overlapping area that protrudes from the strip-shaped transmission line segment of the second electrode. Even though the two respective overlapping areas of the first and second electrode do overlap, they are spaced apart and separated by the tunable dielectric material that is between the first electrode and the second electrode, or at least between the overlapping areas of the first electrode and the second electrode.

In yet another embodiment of the invention the respective overlapping areas of the first electrode and the second electrode provide for a rectangular or a square-shaped parallel plate capacitor area. However, the overlapping areas may have any shape and contour that is advantageous for the desired phase shift or for the design of the electronic component that includes the phase shifting device.

In yet another aspect of the invention, subsequent parallel plate capacitor areas along the transmission line differ in respective distance to each other and/or in size and/or in shape. Thus, the parallel plate capacitor areas may be of identical shape and size and may be arranged in a regular pattern along the transmission line. However, it might be advantageous for example for signal propagation or for reduced size or manufacturing costs to arrange for parallel plate capacitor areas that have a different shape or size along the transmission line. Also, the distance between two adjacent parallel plate capacitor areas may vary according to demands related to size or cost of the phase shifting device, or in order to allow for better signal propagation or enhanced phase shifting properties of the phase shifting device.

According to another aspect of the invention, the first and second electrode can be referenced to one or more ground electrodes located on the outward facing surfaces of the substrate layers. However, the phase shifting device does not rely on the presence of a ground electrode. If, for example for reasons of integrating the sandwich structure with other layers of a phased array antenna, one or more ground electrodes are necessary, the size and the distance of the strip shaped transmission line segments can be easily adjusted when compared to a phase shifting device without ground electrodes.

According to an aspect of the invention, the first electrode and the second electrode are electrically connected to a bias voltage source. The bias voltage can be a constant bias voltage or a preferably low frequency voltage with a frequency of up to several kHz. The bias voltage does not interfere with the signal propagation along the transmission line of the phase shifting device. The bias voltage that is applied to the first and second electrode by the bias voltage affects the dielectric characteristics of the tunable dielectric material that is arranged between the first and the second electrode. By applying a bias voltage to the first and second electrode and thereby affecting and changing the dielectric properties of the tunable dielectric material in between the parallel plate capacitor areas, the phase difference between the input signal and the output signal of the phase shifting device can be easily and reliably controlled and modified according to the respective requirements.

According to an advantageous embodiment of the invention, the first electrode is connected to a first bias electrode which is connected to the bias voltage source, and that the second electrode is connected to a second bias electrode which is connected to the bias voltage source. The width of the bias electrode can be small when compared to the width of the first electrode and of the second electrode. The width can be approx. 10% or less of the width of the first or second electrode. A small width or cross-section area of the first and second bias electrodes contributes to a high impedance of the first and second bias electrode resulting in reduced leakage of the electromagnetic signal from the first and second electrode into the first or second bias electrode.

In yet another embodiment of the invention the first and second bias electrodes consists of a material with a lower electrical conductivity that the first and second electrode. The resulting higher resistance of the bias electrodes prevents the electromagnetic signal that propagates along the transmission line from leaking from the first and second electrode into the first or second bias electrode. Preferably the first and second electrode are made of or comprise a material with a high conductivity of more than $40*10^6$ S/m, like for example gold or copper. The first and second bias electrodes preferably has a sheet resistance of more than 20 Ohms/square and can be made of or comprise Indium Tin Oxide (ITO) or Nichrome (NiCr).

According to another aspect of the invention, the width of the first and second electrode is between 100 µm and 500 µm, preferably approx. 200 µm. Furthermore, the width of the overlapping area between the first electrode and the second electrode is between 100 µm and 500 µm, preferably approx. 200 µm. The width of the first and second electrode should be smaller than Lambda/10, i.e. one-tenth of the characteristic wavelength of the electromagnetic signal that propagates along the transmission line. The lateral distance between the first electrode and the second electrode can be less than 50 µm or even less than 25 µm. For most applications the distance is between 10 µm and 200 µm. However, it is also possible to provide for a distance of more than 200 µm. In general, it is considered advantageous for the distance to be smaller than Lambda/10.

The invention also relates to a phased array antenna comprising several antenna elements that are arranged at a surface of a substrate layer, a single entry point at which a signal is transmitted to or from the several antenna elements, and for each antenna element a corresponding phase shifting device as described above, wherein the phase of each signal that is transmitted from the single entry point to the respective antenna element or that is transmitted from the respective antenna element to the single entry point is modified in order to adjust the superposition of each signal according to the preferred direction of radiation of the antenna system.

In order to reduce the space requirement and to facilitate the manufacturing, the phased array antenna comprises, in a stacked arrangement, a base layer with an entry point, a first substrate layer with a first electrode, a tunable layer that comprises the tunable dielectric material, a second substrate layer with a second electrode and an antenna layer with a radiating antenna structure. The first and second electrode can be arranged onto the respective surface of the first and second substrate layer by any suitable method, for example by printing or vapor deposition or by any method used within the semiconductor industry. The lateral dimension of the phased array antenna can be some millimeters or up to some centimeters or decimeters. The dimensions are preferably adapted to the frequency of the electromagnetic signal that is received or emitted by the respective antennas. The more antennas that are incorporated into the phased array antenna, the larger the lateral dimensions will be. The individual antennas are preferably arranged in a regular grid pattern of a rectangular or squared shape. However, it is also possible to arrange the antennas of the phased array antenna in a circular shape with several concentric circles of individual antennas.

According to an advantageous embodiment of the invention, the first substrate layer and the second substrate layer consists of a glass material, and the tunable layer comprises a liquid crystal material with tunable dielectric properties.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

DETAILED DESCRIPTION OF THE INVENTION

Figure 1:
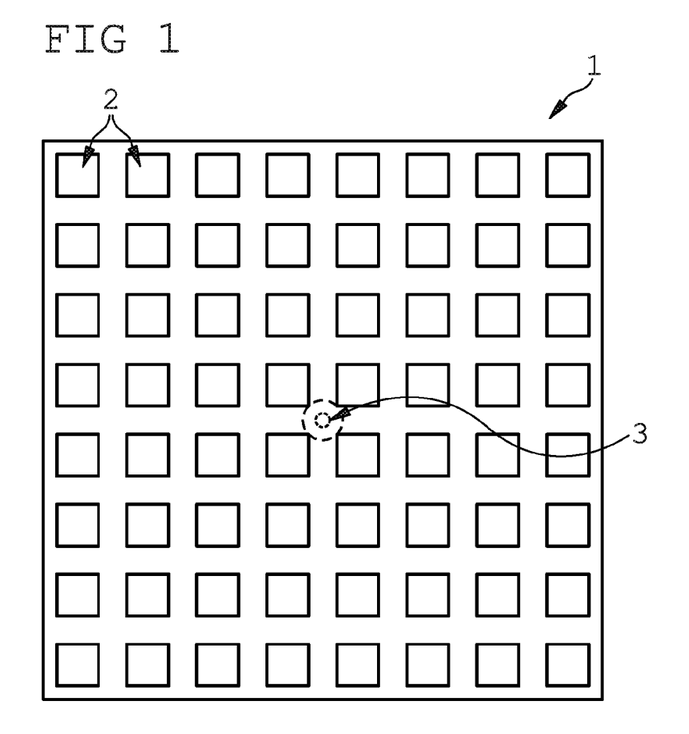
FIG. 1 illustrates a schematic top view of a phased array antenna that comprises 64 individual antennas arranged in a square-shaped grid pattern.

A phased array antenna 1 that is shown in FIG. 1 comprises 64 individual antenna elements 2 that are arranged in a square-shaped grid pattern with 8×8 antenna elements 2. In the center there is a single signal feed point 3 that is located on the back side of the grid pattern. An electromagnetic signal, preferably a radiofrequency signal, can be introduced into the phased array antenna 1 by the signal feed point 3 and distributed to all of the respective antenna elements 2. In the same manner an electromagnetic signal that is received by the individual antenna elements 2 of the phased array antenna 1 can be transmitted to the signal feed point 3 and extracted from the phased array antenna. All individual antenna elements 2 are connected with the signal feed point 3. The connection comprises a dedicated phase shifting device for each individual antenna element 2, however, the phase shifting devices are not shown in FIG. 1.

The phase shifting devices can be the electrical connection of the individual antenna elements 2 to the signal feed point 3. Preferably, for each antenna element 2 the corresponding phase shifting device is only a part or section of the electrical connection to the signal feed point 3.

Figure 2:
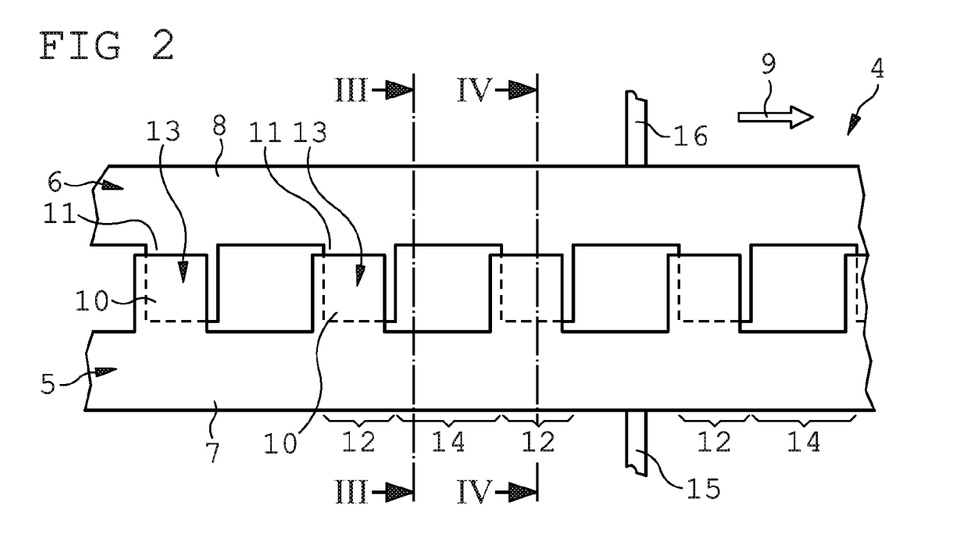
FIG. 2 illustrates a schematic top view of a transmission line of a single phase shifting device.

FIG. 2 illustrates a schematic top view of a transmission line 4 of a single phase shifting device. The transmission line 4 comprises a first electrode 5 and a second electrode 6, wherein the first electrode 5 is at a different level with respect to the second electrode 6, thus resulting in a distance between the first electrode 5 and the second electrode 6. In FIG. 2, the first electrode 5 is on top of the second electrode 6. In order to better illustrate the lateral distance between the first electrode 5 and the second electrode 6, the first and second electrode 5, 6 are shown slightly displaced with respect to each other, and the respective parts of the second electrode 6 that are below the corresponding parts of the first electrode 5 are shown with a dashed line.

Each of the first and second electrode 5, 6 comprises a strip-shaped transmission line segment 7, 8 that extends along a straight line in the direction of a signal propagation direction 9. At regular intervals a rectangular overlapping area 10, 11 laterally protrudes from the respective strip-shaped transmission line segment 7, 8 of the first electrode 5 and of the second electrode 6. Within an overlapping section 12 of the transmission line 4, one overlapping area 10 of the first electrode 5 overlaps with one corresponding overlapping area 11 of the second electrode 6. The two overlapping areas 10, 11 provide for a parallel plate capacitor area 13 of squared shape when viewed from the top. The overlapping sections 12 of the transmission line 4 alternate with non-overlapping sections 14 that only comprises the strip-shaped transmission line segments 7, 8 that are at a distance to each other and that do not overlap like within the overlapping sections 12 of the transmission line 4.

The non-overlapping sections 14 do not change much of the phase of the electromagnetic signal that propagates along the first and second electrode 5, 6 of the transmission line 4 in the direction of the signal propagation direction 9. However, each of the overlapping sections 12 affects the phase of the propagating electromagnetic signal resulting in a significant phase shift of up to 2π or more from a phase shifting device that can be easily integrated into the phased array antenna 1 of FIG. 1.

A first bias electrode 15 is connected to the strip-shaped transmission segment 7 of the first electrode 5 and projects in the opposite direction of the overlapping areas 10 of the first electrode 5. Similarly, a second bias electrode 16 is connected to the strip-shaped transmission segment 8 of the second electrode 6 and projects in the opposite direction of the overlapping areas 11 of the second electrode 6. The first and second bias electrodes 15, 16 are connected to a bias voltage source not shown in FIG. 2. The bias voltage source provides for a constant, i.e. DC voltage or for a low-frequency AC voltage that is applied to the first and second electrode 5, 6 and creates an electric field in the space between the first electrode 5 and the second electrode 6, thereby superimposing the electric field with the electromagnetic field of the signal that propagates along the transmission line 4. The electric field is perpendicular to the plane of view, i.e. perpendicular to the parallel plate capacitor areas 13 shown in FIG. 2. Due to the material and the small width of the first and second bias electrode 15, 16, the impedance of the first and second bias electrode 15, 16 is significantly higher than the impedance of the strip-shaped transmission segments 7, 8 of the first and second electrode 5, 6 which prevents the propagating electromagnetic signal from leaking from the first and second electrode 5, 6 into the first and second bias electrode 15, 16 and away from the transmission line 4. By choosing a highly resistive bias electrode material, the impedance of the bias electrodes can be further increased.

Figure 3:
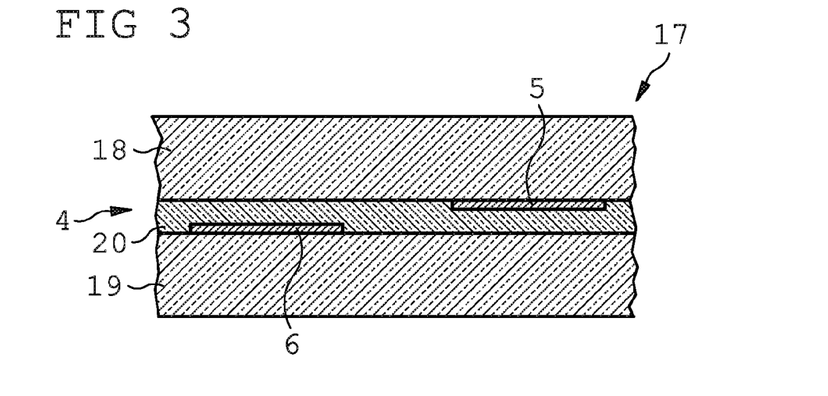
FIG. 3 illustrates a sectional view of the transmission line as shown in FIG. 2 taken along the line III-III.
Figure 4:
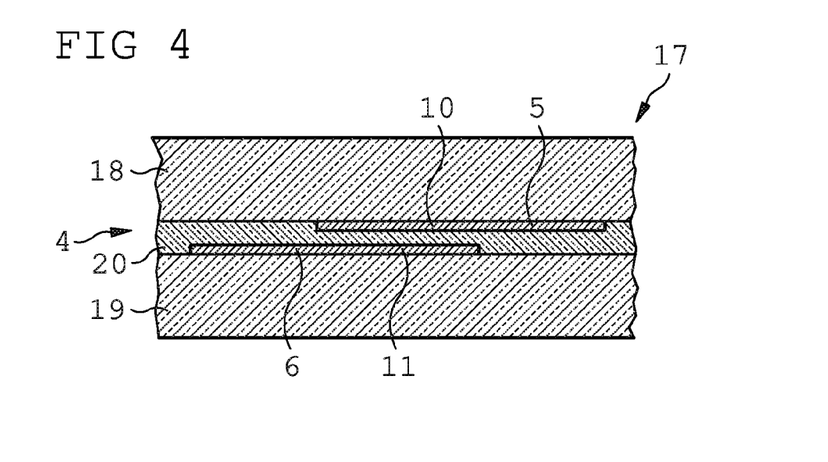
FIG. 4 illustrates a sectional view of the transmission line as shown in FIG. 2 taken along the line IV-IV.

FIGS. 3 and 4 illustrate two sectional views of a phase shifting device 17 with a transmission line 4 as shown in FIG. 2. FIG. 3 is a sectional view of a non-overlapping section 14 of the transmission line 4 in FIG. 2, whereas FIG. 4 is a sectional view of an overlapping section 12 of the transmission line 4 in FIG. 2.

The first electrode 5 is on top of a first substrate layer 18 made of glass material. The second electrode 6 is on top of a second substrate layer 19 also made of glass material. The first and second substrate layers 18, 19 are arranged at a distance to each other with the first electrode 5 facing the second electrode 6. Between the first and second substrate layer 18, 19 there is a tunable layer 20 that is filled with a liquid crystal material. The dielectric properties of the liquid crystal material can be modified by applying different bias voltages to the first and second electrode 5, 6 resulting in electric fields of different magnitude between the first and second electrode 5, 6. In the overlapping section 12 as shown in FIG. 2, the overlapping area 10 of the first electrode 5, the corresponding overlapping area 11 of the second electrode 6 and the liquid crystal material in between provide for a parallel plate capacitor with a capacitance that depends on the bias voltage.

Figure 5:
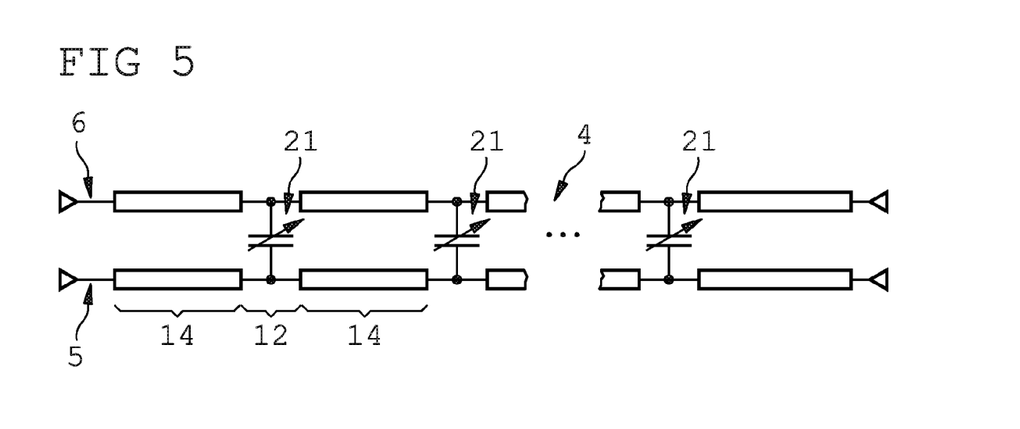
FIG. 5 illustrates a topological representation of the transmission line as shown in FIG. 2.

The topological representation of the transmission line 4 as illustrated in FIG. 5 is that of a periodically loaded differential transmission line with the two electrodes 5, 6 and capacitive loads 21 of the overlapping sections 12 that alternate with the non-overlapping sections 14.

Figure 6:
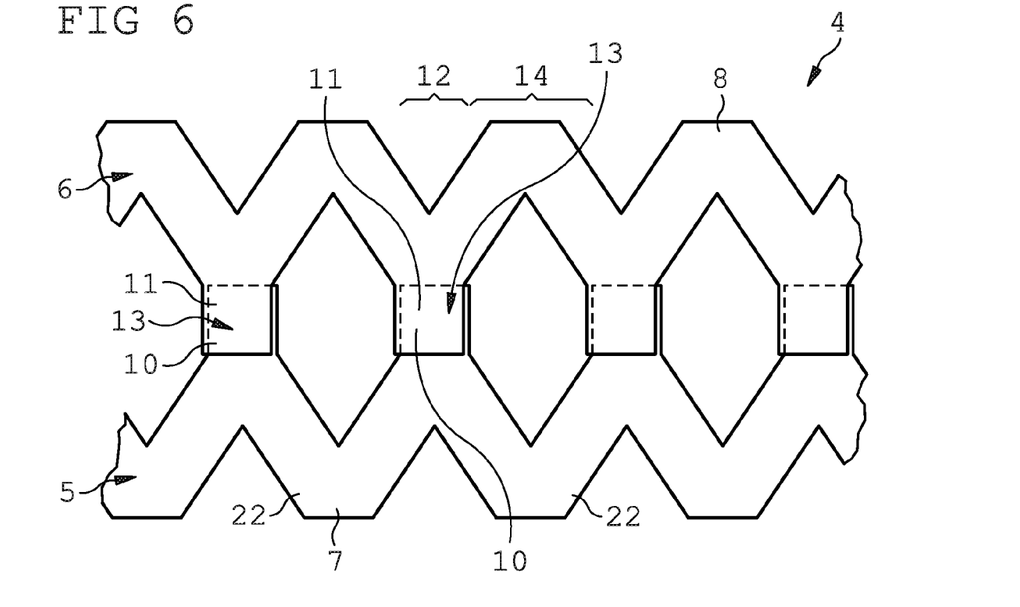
FIG. 6 illustrates a schematic top view of a transmission line of a single phase shifting device, wherein strip-shaped transmission line segments of the first and second electrode are arranged in a zig-zag pattern.

FIG. 6 illustrates a schematic top view of an alternative embodiment of the transmission line 4, wherein the strip-shaped transmission line segments 7, 8 of the respective first and second electrode 5, 6 are arranged in a zig-zag pattern. This allows for longer non-overlapping areas 22 of the respective first and second electrodes 5, 6 between the overlapping sections 12 along the transmission line 4 as compared to a straight-line arrangement of the transmission line segments 7, 8 as shown in FIG. 2.

Figure 7:
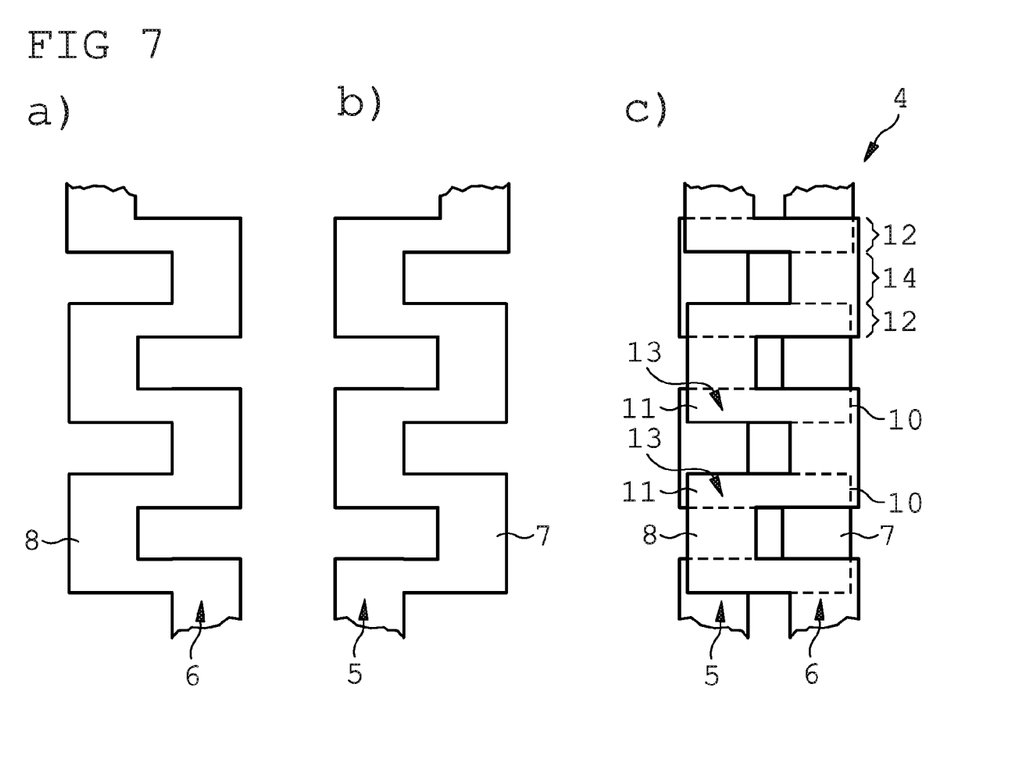
FIG. 7a illustrates a first electrode.
FIG. 7b illustrates a second electrode.
FIG. 7c is a schematic top view of a transmission line of a single phase shifting device, wherein the strip-shaped transmission line segments exhibit a square-wave meandering pattern combining the first electrode of FIG. 7a and the second electrode of FIG. 7b.

FIGS. 7*a*, 7*b* and 7*c* illustrate a schematic top view of a transmission line 4 of a single phase shifting device, wherein the strip-shaped transmission line segments 7, 8 exhibit a square-wave meandering pattern. The first electrode is separately shown in FIG. 7*a*, the second electrode is separately shown in FIG. 7*b*, and the overlapping arrangement of both first and second electrode 5, 6 is shown in FIG. 7*c*.

Figure 8:
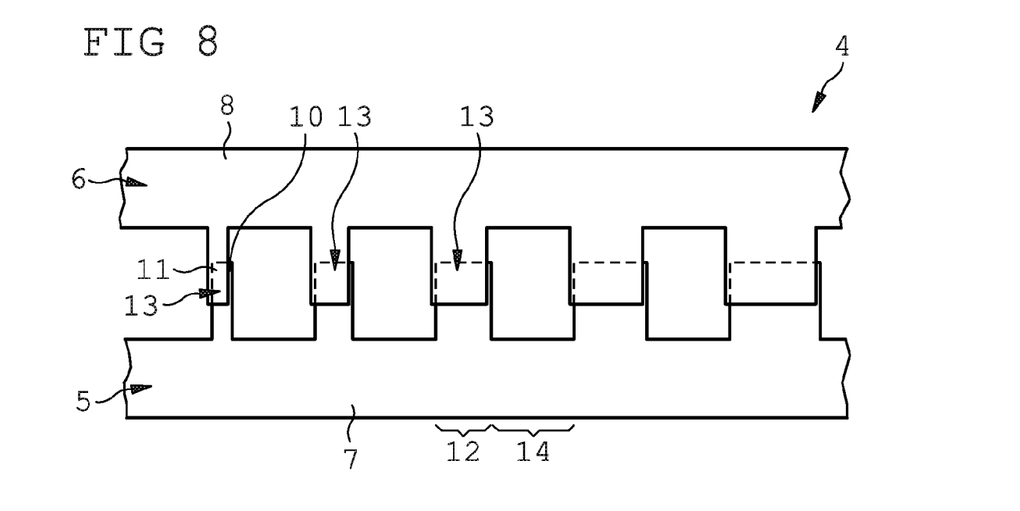
FIG. 8 illustrates a schematic top view of a transmission line of a single phase shifting device, wherein parallel plate capacitor areas along the transmission line differ in size and in shape.

FIG. 8 illustrates a schematic top view of a transmission line of a single phase shifting device that is similar to the embodiment shown in FIG. 2. However, the parallel plate capacitor areas 13 along the transmission line 4 differ in size and in shape. Furthermore, the distance between subsequent parallel plate capacitor areas 13 may also vary along the transmission line 4.

Figure 9:
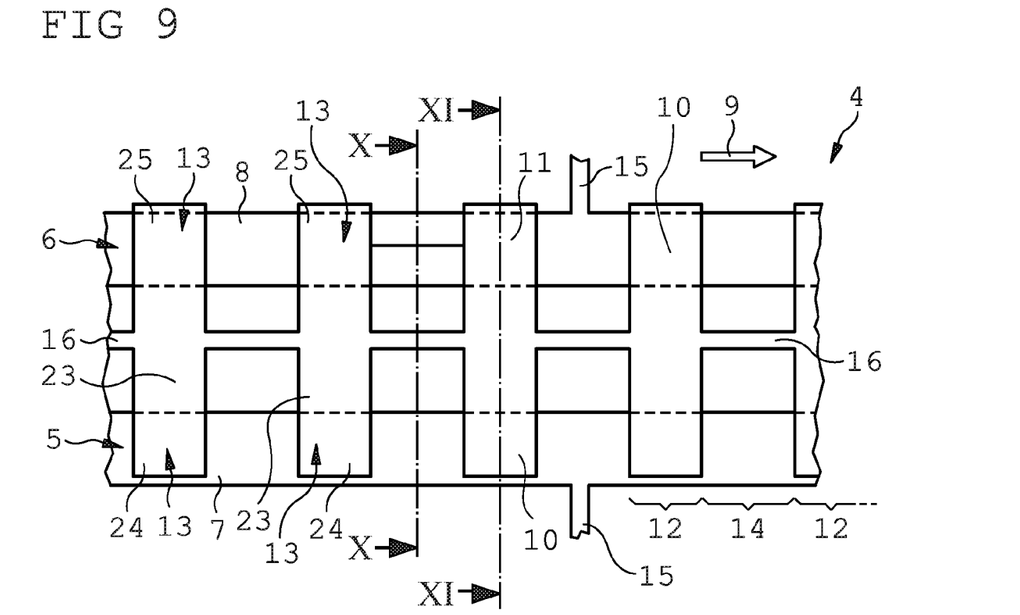
FIG. 9 illustrates a schematic top view of a transmission line of a single phase shifting device, wherein the first electrode and the second electrode are overlapped by several capacitor electrodes.

FIG. 9 illustrates a schematic top view of a transmission line of a single phase shifting device, wherein the first electrode 5 and the second electrode 6 each consists of a straight-line strip-shaped transmission line segment 7, 8 that are directed along the direction of the transmission line 4 that equals the signal propagation direction 9. The transmission line segments 7, 8 are overlapped by several rectangular capacitor electrodes 23 that are directed perpendicular to the signal propagation direction 9. A first capacitor electrode area 24 of each capacitor electrode 23 overlaps with the corresponding overlapping area 10 of the first electrode 5, and a second capacitor electrode area 25 of each capacitor electrode 23 overlaps with the corresponding overlapping area 11 of the second electrode 6. Thus, the first and second capacitor electrode areas 24, 25 and the corresponding overlapping areas 10, 11 of the first and second electrode 5, 6 provide for two separate parallel plate capacitor areas 13 within each overlapping section 12 of the transmission line 4.

Figure 10:
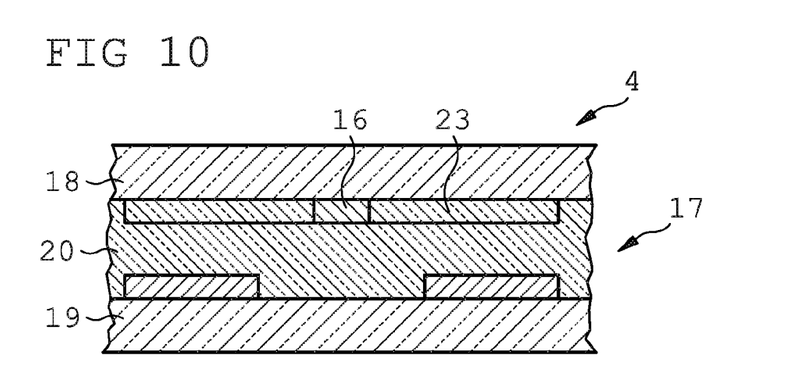
FIG. 10 illustrates a sectional view of the transmission line as shown in FIG. 9 taken along the line X-X.
Figure 11:
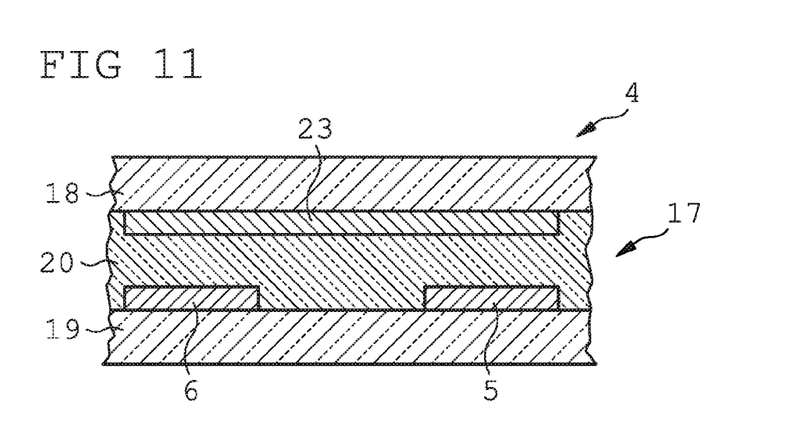
FIG. 11 illustrates a sectional view of the transmission line as shown in FIG. 9 taken along the line XI-XI.

FIGS. 10 and 11 illustrate two sectional views of a phase shifting device 17 with a transmission line 4 as shown in FIG. 9. FIG. 10 is a sectional view of a non-overlapping section 12 of the transmission line 4 in FIG. 9, whereas FIG. 11 is a sectional view of an overlapping section 14 of the transmission line 4 in FIG. 9. Both first and second electrode 5, 6 (FIG. 11) are on the same level and on top of a first substrate layer 18 made of glass material. The rectangular capacitor electrodes 23 are on top of a second substrate layer 19 also made of glass material. The first and second substrate layers 18, 19 are arranged at a lateral distance to each other with the first and second electrode 5, 6 facing the capacitor electrodes 23. Between the first and second substrate layer 18, 19 there is a tunable layer 20 that is filled with a liquid crystal material. The dielectric properties of the liquid crystal material can be modified by applying different bias voltages to the first and second electrode 5, 6 and to the capacitor electrodes 23, resulting in electric fields of different magnitude between the first and second electrode 5, 6 and the respective overlapping areas 24, 25 (FIG. 9) of the capacitor electrodes 23. In the overlapping section 12 as shown in FIG. 9, the overlapping area 10 of the first electrode 5 and the corresponding overlapping area 24 of the capacitor electrode 23 as well as the overlapping area 11 of the second electrode 6 and the corresponding overlapping area 25 of the capacitor electrode 23 in combination with the liquid crystal material in between each provide for a parallel plate capacitor area 13 with a capacitance that depends on the bias voltage. The bias electrode 16 (FIG. 10) that is connected to all capacitor electrodes 23 is a strip-shaped linear bias electrode 16 that extends parallel to the first and second electrode 5, 6, but on the same level as the capacitor electrodes 23 and provides for electrical connection of all the capacitor electrodes 23 with the bias voltage source that is not shown in the figures.

What is claimed is:

1. A radio frequency phase shifting device with a transmission line, wherein the transmission line comprises:
    a first electrode and a second electrode which propagate a differential pair of radio frequency electromagnetic signals along the first electrode and the second electrode with a phase difference of 180° between the respective electromagnetic signals;
    non-overlapping sections, in which
    the first electrode extends at a distance from the second electrode;
    overlapping sections,
    in which an overlapping area of the first electrode overlaps an overlapping area of the second electrode; and
    a tunable dielectric material arranged between the overlapping area of the first electrode and the overlapping area of the second electrode,
    wherein the tunable dielectric material causes a phase shift of the electromagnetic signals that are propagated along the transmission line.

2. The radio frequency phase shifting device according to claim 1, wherein the overlapping area of the first electrode and the overlapping area of the second electrode form a parallel plate capacitor area.

3. The radio frequency phase shifting device according to claim 2, wherein a first parallel plate capacitor area formed in a first of the overlapping sections and a second parallel plate capacitor area formed in a second of the overlapping sections along the transmission line differ in respective distance to each other and/or in size and/or in shape.

4. The radio frequency phase shifting device according to claim 2,
    wherein the first electrode is arranged at a first surface of a first substrate layer,
    wherein the second electrode is arranged at a second surface of a second substrate layer, such that the first surface of the first substrate layer faces the second surface of the second substrate layer and
    wherein the first surface is arranged at a distance to the second surface.

5. The radio frequency phase shifting device according to claim 4, wherein the first surface of the first substrate layer and the second surface of the second substrate layer confine the tunable dielectric material.

6. The radio frequency phase shifting device according to claim 1, wherein the first electrode and the second electrode each comprise a strip-shaped transmission line segment, and wherein both transmission line segments are directed along the transmission line.

7. The radio frequency phase shifting device according to claim 6, wherein the strip-shaped transmission line segments are meander-shaped.

8. The radio frequency phase shifting device according to claim 6, wherein the strip-shaped transmission segments comprise lateral protrusions forming of the overlapping areas of the first electrode and the second electrode.

9. The radio frequency phase shifting device according to claim 1, wherein the respective overlapping areas of the first electrode and the second electrode form a rectangular parallel plate capacitor area.

10. A phased array antenna, comprising several antenna elements that are arranged at a surface of a substrate layer,
a signal feed network from or to which a signal is transmitted to or from the several antenna elements, and
for each antenna element, a corresponding radio frequency phase shifting device according to claim 1, wherein the phase of each signal that is transmitted from a single signal feed point to the respective antenna element or that is transmitted from the respective antenna element to the single signal feed point is modified in order to adjust the superposition of each signal according to a preferred direction of radiation of the phased array antenna.

11. The phased array antenna according to claim 10, wherein the phased array antenna comprises, in a stacked arrangement, for each antenna element:
a base layer,
a first substrate layer with the first electrode,
a tunable layer with the tunable dielectric material,
a second substrate layer with the second electrode, and
an antenna layer with a radiating antenna structure.

12. The phased array antenna according to claim 11, wherein the first substrate layer and the second substrate layer consists of a glass material, and that the tunable layer comprises a liquid crystal material with tunable dielectric properties.

13. The radio frequency phase shifting device according to claim 1, wherein the first electrode and the second electrode are electrically connected to at least one bias voltage source.

14. The radio frequency phase shifting device according to claim 1, wherein a width of the first and second electrode is respectively between 100 µm and 500 µm.

15. The radio frequency phase shifting device according to claim 14, wherein the width of the first and second electrode, is respectively approximately 200 µm.

16. The radio frequency phase shifting device according to claim 1,
wherein the first electrode is connected to a first bias electrode which is connected to a bias voltage source, and
wherein the second electrode is connected to a second bias electrode which is connected to the bias voltage source or to a further bias voltage source.

17. The radio frequency phase shifting device according to claim 16, wherein a width of the first and second bias electrodes is smaller than a width of the first and second electrode.

18. A radio frequency phase shifting device with a transmission line, wherein the transmission line comprises:
a first electrode and a second electrode which propagate a differential pair of radio frequency electromagnetic signals along the first electrode and the second electrode with a phase difference of 180° between the respective electromagnetic signals;
a capacitor electrode;
non-overlapping sections, in which the capacitor electrode does not overlap the first electrode and the second electrode;
overlapping sections, in which
an overlapping area of the first electrode overlaps a first capacitor electrode area of the capacitor electrode and
an overlapping area of the second electrode overlaps a second capacitor electrode area of the capacitor electrode; and
a tunable dielectric material arranged between the overlapping area of the first electrode and the first capacitor electrode area and between the overlapping area of the second electrode and the second capacitor electrode area,
wherein the tunable dielectric material causes a phase shift of the electromagnetic signals that are propagated along the transmission line.

19. The radio frequency phase shifting device according to claim 18,
wherein the first electrode and the second electrode are arranged side by side, and
wherein the capacitor electrode is arranged above or below the first electrode and the second electrode, and
wherein the first capacitor electrode area and the overlapping area of the first electrode form a first parallel plate capacitor area, and
wherein the second capacitor electrode area and the overlapping area of the second electrode form a second, parallel plate capacitor area.

* * * * *